United States Patent [19]

Kawashima et al.

[11] 4,432,622
[45] Feb. 21, 1984

[54] FOCUSING-POSITION-DETECTION CIRCUIT

[75] Inventors: Ikue Kawashima, Iwanuma; Yoshio Fukushima, Machida; Tamio Murano, Itami; Toshitatsu Suzuki, Takarazuka, all of Japan

[73] Assignee: Ricoh Company, Ltd., Tokyo, Japan

[21] Appl. No.: 385,826

[22] Filed: Jun. 7, 1982

[30] Foreign Application Priority Data

Jun. 16, 1981 [JP] Japan .................................. 56-92808
Jun. 26, 1981 [JP] Japan .................................. 56-99198

[51] Int. Cl.³ .............................................. G03B 3/10
[52] U.S. Cl. .................................................... 354/408
[58] Field of Search ............................................ 354/25

[56] References Cited

U.S. PATENT DOCUMENTS

4,247,762 1/1981 Wilwerding ........................ 354/25 X
4,331,864 5/1982 Nakajima et al. ................... 354/25 X

*Primary Examiner*—Michael L. Gellner
*Attorney, Agent, or Firm*—Oblon, Fisher, Spivak, McClelland & Maier

[57] ABSTRACT

A focusing position detection circuit provided with a pair of light receiving element arrays respectively disposed in front of and behind a predetermined focusing plane of an optical system, capable of determining the position of the optical system by the output signals of the light receiving element arrays, and outputting an analog signal corresponding to the position of the optical system in the defocused range, but in the focused range with a predetermined tolerance, outputting a focused signal at a predetermined level.

3 Claims, 10 Drawing Figures

FOCUSING-POSITION-DETECTION CIRCUIT

BACKGROUND OF THE INVENTION

1. Field of the Invention

The present invention relates to a focusing-position-detection circuit for use in optical instruments such as cameras.

2. Description of the Prior Art

Conventionally, as a focusing position detection circuit system, there is known an equal-defocusing-detection circuit system in which two light receiving elements or two light receiving element arrays are symmetrically disposed with respect to a predetermined focusing plane of an object lens, with a small space therebetween. The light receiving elements or arrays detect the degree of defocusing of an image, and the position where the defocusing detected by the two light receiving elements or by two light receiving element arrays is equal is regarded as the focused position of the lens.

Japanese patent publication No. 43-10265 discloses such an equal-defocusing-detection circuit system in which two light receiving element arrays are employed, and the differences in output between adjacent light receiving elements in each light receiving element array are subjected to (i) a non-linear operation such as conversion of differences to absolute values, (ii) the integration of the absolute values and (iii) the comparison of those integrated values. In this circuit system, however, the defocusing is detected only by the comparison of the differences in output of the adjacent light receiving elements. In other words, only high space frequency components of an image on the surface of the light receiving elements are detected and, therefore, the defocusing detection output is generated only in an extremely narrow defocusing range near the focused position. Therefore, when the degree of defocusing is great, the defocusing position detection output is too small to recognize where the focused position of the object lens is, that is in front of or behind the film position.

Hereafter, for the convenience of explanation, when the focusing position of an object lens with respect to an object is in front of the film position, the position of the object lens is referred to as the "front focusing" position. Likewise, when the focusing position of the object lens is behind the film position, the position of the object lens is referred to as the "back focusing" position. When the focusing position of the object lens is exactly at the film position, the position of the object lens is referred to as "focused" position.

Figure 1:
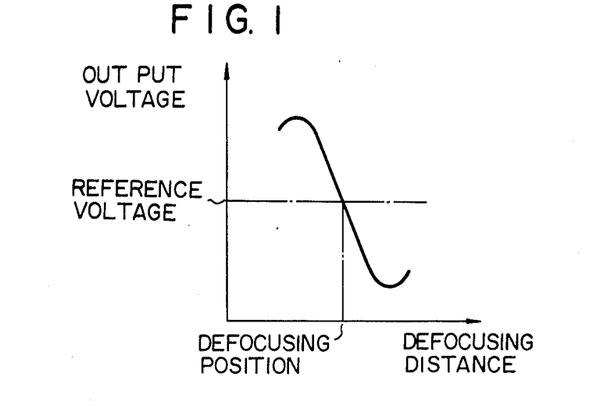
FIGS. 1 and 2 are graphs showing the distance measurement characteristics of conventional focusing position detection circuits.
Figure 2:
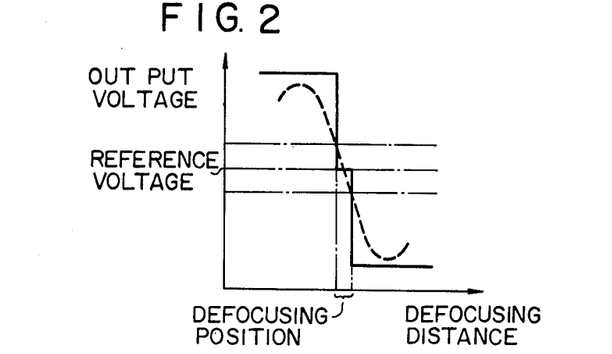

Further, two types of equal-defocusing-detection circuit systems are known. In one type, the defocusing detection output, corresponding to the defocusing degree as shown in FIG. 1, is applied to a lens drive motor. In the other type, out of the front focusing, back focusing and focused positions, one focusing state is recognized by the defocusing detection output, and one signal of those possible signals with different values as shown in FIG. 2 is applied to the lens drive motor. In the former type, since an analog signal is applied to the lens drive motor, the stop operation for stopping the object lens exactly at the focused position tends to be unstable. In the latter type, when the lens is driven from the front-focusing range or from the back-focusing range to the focused range by the lens drive motor, the lens has to be stopped immediately when the lens reaches the focused range. However, over-run from the focusing position of the lens is apt to occur and it is difficult to perform accurate focusing operations. Furthermore, when the defocusing is extreme or when the contrast of the object is low, the contrast of the image of the object is significantly reduced on the light receiving element arrays. The result is a risk that the system cannot distinguish between the front focusing, the back focusing and the focused position.

SUMMARY OF THE INVENTION

It is therefore an object of the present invention to provide a focusing-position-detection circuit capable of measuring distances within a wide defocusing range.

Another object of the present invention is to provide a focusing position detection circuit capable of stopping the optical system in a stable manner by outputting a focusing signal with a predetermined constant level at a focused range with a predetermined tolerance range.

A further object of the invention is to provide a focusing-position-detection circuit which is capable of preventing erroneous distance measurement by outputting a signal for driving the optical system mechanically when the distance measurement is impossible.

These and other objects of the present invention are attained by (i) obtaining the differences in the output between predetermined pairs of light receiving elements, including adjacent and non-adjacent pairs, of two light receiving element arrays which are disposed in front of and behind a predetermined focusing plane of an optical system, by (ii) determining the position of the optical system from the obtained difference in the outputs of the light receiving elements, and by (iii) detecting not only the defocusing of high frequency components, but also the defocusing of low frequency components.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 3:
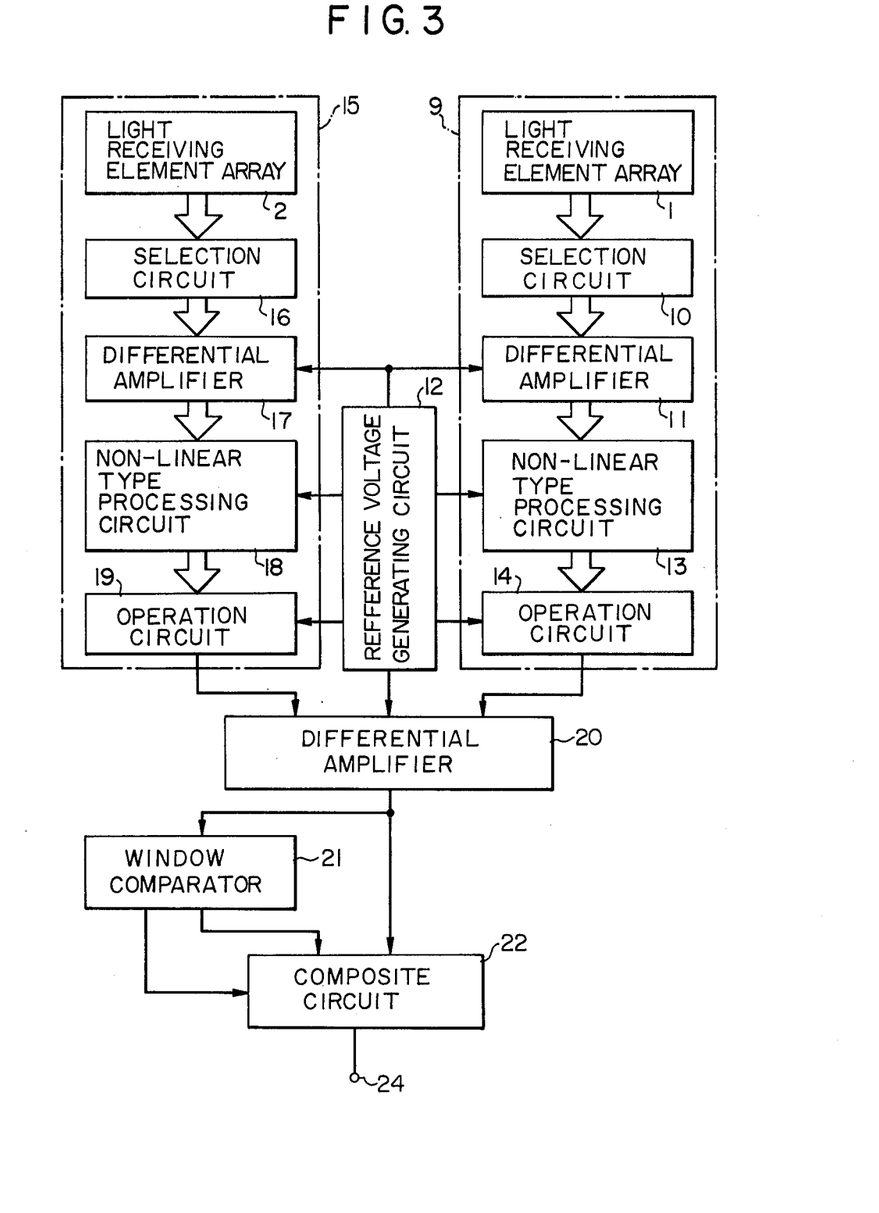
FIG. 3 is a block diagram of an embodiment of a focusing-position-detection circuit according to the invention.
Figure 4:
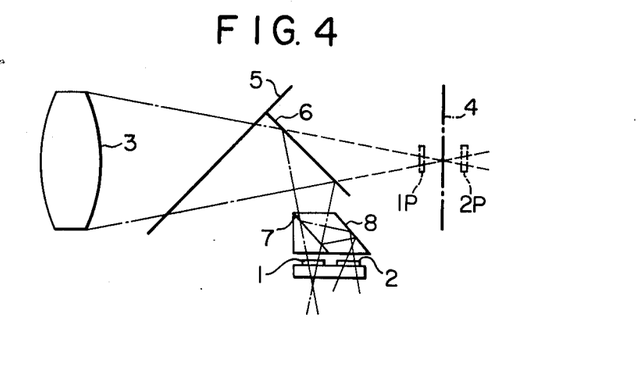
FIG. 4 is a front view of a light receiving portion of the embodiment shown in FIG. 3.

Referring now to the drawings, wherein like reference numerals designate identical or corresponding parts throughout several views, and more particularly to FIGS. 3 and 4, there is shown an embodiment of a focusing position detection circuit according to the invention. In the camera employing this embodiment, light receiving element arrays 1 and 2 are arranged symmetrically, each on opposite sides of, and at a slight distance from, what is the optical equivalent of the predetermined film plane 4 of a lens 3, that is, at the optical equivalent of front position 1P and back position 2P, respectively.

The image of an object is projected to the light receiving element arrays 1 and 2 by the lens 3, via a half-mirror 5, total-reflection mirror 6, a half-mirror 7 and a total-reflection mirror 8. The light receiving element arrays 1 and 2 include an equal number of light receiving elements (each not less than 3). The light receiving element arrays 1 and 2 are silicon photodiode arrays, in each of which a plurality of light receiving elements is arranged in a straight row. The light receiving element arrays 1 and 2 can contain an amplifier at a first step, which amplifier performs logarithmic compression if necessary.

In an operation circuit system 9, including the light receiving element array 1 disposed in front of the film plane 4, when the camera is directed towards an object and the image of the object is focused on the light receiving element array 1 by the lens 3, each of the light receiving elements of the light receiving element array 1 receives a quantity of light corresponding to the optical pattern of the image. Even if the light distribution pattern on the light receiving element array 1 of the projected image is not uniform in intensity, the quantity of light is integrated and the total thereof is output in the form of an electric current output. When necessary, this electric current output is subjected to logarithmic compression by the amplifier at the first step and is then converted to a voltage, which is transferred to the next step 10.

In general, when an optical image is in focus on a light receiving element array, the law of probability indicates that the differences in the output among the individual light receiving elements in the array will be greater, in comparison with cases where the image is out of focus with respect to the plane of the array. Stated another way, when the focusing position is away from the surface of a light receiving element array, the difference in the output among the individual light receiving elements decreases due to the lowered contrast of the out-of-focus image. This indicates that an out-of-focus state of the image on the light receiving element array can be determined by the difference in output among the individual light receiving elements.

More specifically, measurement of the difference in the output between adjacent light receiving elements corresponds to measurement of the defocusing of the high space frequency components. High space frequency components are at their maximum when the focused position coincides with the surface of the light receiving element array. As the focused position is shifted away from the plane of the light receiving element array, that is, as defocusing increases, the high space frequency components decrease. In contrast to this, the measurement of the difference in output between non-adjacent light receiving elements corresponds to the measurement of the defocusing of the low space frequency components. Low space frequency components also increase when the focused position coincides with the surface of the light receiving element array, but do not decrease as quickly as do the high space frequency components as the focusing position is shifted away from that plane, and can be easily observed until the deviation or shift in focus is quite great.

Therefore, observation of the high space frequency component is useful for determining the focused position when said position is relatively near the predetermined film plane. On the other hand, observation of the low space frequency components is useful for determining roughly whether the lens is relatively near to being in focus, or relatively greatly out of focus.

Referring back to FIG. 3, a selection circuit 10 at the next step selects predetermined combinations of pairs of light receiving elements in the light receiving element array 1 which are not adjacent to each other, in addition to combinations of adjacent pairs, and applies to the next step the output signals indicating the differences in the outputs between those various pairs of light receiving elements. For instance, when the light receiving element array 1 includes n light receiving elements, the maximum number of combinations, each consisting of 2 light receiving elements, $_nC_2=n(n-1)/2$, are successively selected.

The outputs of each two light receiving elements, which are output from the selection circuit 10, are input to the two input terminals of a differential amplifier 11, when necessary, through a buffer amplifier. To the non-inversion input terminals of the differential amplifier 11 is applied a reference voltage which is ½ the power source voltage output from a reference voltage generation circuit 12. Therefore, the output of the differential amplifier 11 is equal to the sum of (i) the difference in the output between the two light receiving elements and (ii) the reference voltage. The result is that the difference in the output between the two light receiving elements, capable of generating a positive polarity or a negative polarity, is obtained in the form of an output with one polarity, by use of the single power source with one polarity.

The output of the differential amplifier 11 is input to a non-linear type processing circuit 13, in which the output is converted to an absolute value, assuming the reference voltage to be at the zero level, or the difference between the output and the reference voltage is raised to the pth power, where p is an integer other than 1. This processing is referred to as non-linear processing.

The output of the non-linear processing circuit 13 is input to an operation circuit 14. In this embodiment, the operation circuit comprises an integration circuit, which integrates, with a predetermined time constant, the output signals of the non-linear type processing circuit 13 which are successively input to the integration circuit, and accumulates the integrated output signals. When the inputting of signals for all the sets consisting of two light receiving elements has been completed, an inner gate is opened and the final integration value is sampled and held, and is then output to the next step through a buffer amplifier.

Turning now to light receiving element array 2, since the object image is formed in focus far from the light receiving element array 2, an out-of-focus image falls on the plane of the light receiving element array 2. In this case, the difference in output between two arbitrarily selected light receiving elements in the light receiving element array 2 is smaller in absolute value than the difference in output between the corresponding two light receiving elements in the light receiving element array 1. Therefore, the output of the operation circuit system 15, which is processed in a similar manner to the case of the output of the light receiving element array 1 through operation circuit system 9—that is, by a selection circuit 16, a differential amplifier 17, a non-linear type processing circuit 18 and an operation circuit 19—is smaller than the output of the operation circuit system 9. This indicates that the plane of focus of the lens 3 in its present setting is shifted from the predetermined film plane 4 towards the light receiving element array 1. In other words, the lens 3 has to be adjusted so as to move its plane of focus backwards in order to coincide with the predetermined focusing plane 4 and bring the image into proper focus.

This determination that the plane of focus of lens 3 should be moved backwards was made based on the magnitude of the outputs of the operation circuit systems 9 and 15. When both outputs are equal, the focusing plane of the lens 3 is exactly in the middle between the light receiving element arrays 1 and 2, that is, the focusing plane of the lens coincides with the predetermined film plane 4, and therefore, it is unnecessary to adjust the lens 3 any further.

In order to make the just-mentioned judgment, the outputs of the two operation circuit systems 9 and 15 are input to the input terminals of a differential amplifier 20, and a reference voltage is applied from a reference voltage generation circuit 12 to the non-inversion input side of the differential amplifier 20, whereby the output of the differential amplifier 20, indicating the difference in output between the operation circuit systems 9 and 15, is obtained in the form of an absolute value with a definite single polarity, which may be greater or smaller than the reference voltage, but not in the form of a value with a positive or negative polarity.

The output of the differential amplifier 20 is input to a window comparator 21 and a composite circuit 22. The window comparator 21 is capable of judging whether or not the input signal is in the range (in-focus range) between the two comparative voltages, one of which is above the reference voltage by a predetermined value, while the other is below the reference voltage by the predetermined value. When the input signal is between the two comparative voltages, the window comparator 21 outputs the reference voltage and the selection signal to the composite circuit 22, while when the input signal is not between the two comparative voltages, the window comparator 21 outputs neither the reference voltage nor the selection signal.

Figure 5A:
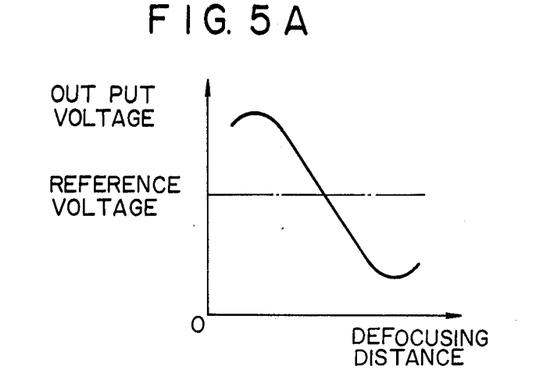
FIGS. 5A to 5C are graphs explaining the operating characteristics of the embodiment shown in FIG. 3.
Figure 5B:
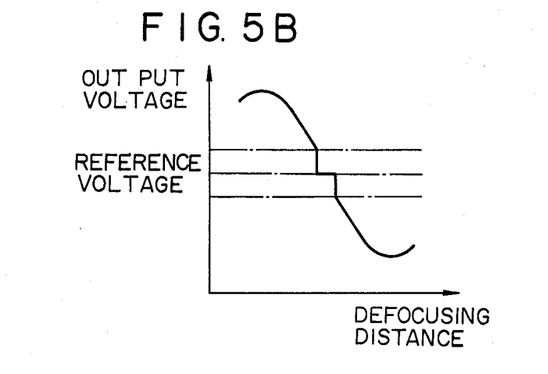

When the composite circuit 22 does not receive the selection signal from the window comparator 21, the composite circuit 22 directly receives the output of the differential amplifier 20 and outputs the same. On the other hand, when the composite circuit 22 receives the selection signal from the window comparator 21, the composite circuit 22 stops the output from the differential circuit 20, and instead receives the reference voltage from the window comparator 21 and outputs the same as the focusing signal, whereby the output of the differential amplifier 20, shown in FIG. 5A, is converted to the output as shown in FIG. 5B.

Figure 5C:
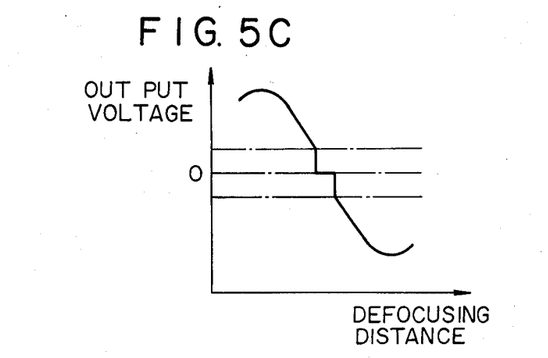

The output signal of the composite circuit 22 is transmitted from an output terminal 24 to the lens side, with the voltage level thereof being maintained, or, if necessary with the voltage level thereof being converted to an electric current level as shown in FIG. 5C by a voltage/current conversion circuit, whereby the lens 3 is driven to the focused position by a lens drive motor. There is provided a grounding terminal which is shared by the camera side and the lens side. On the camera side, by the output signal from the output terminal 24, the normal rotation, rotation stop and reverse rotation of the lens drive motor can be described and, at the same time, it can be detected whether the lens 3 is near or far from the focused position. Therefore, when the lens 3 comes near the focused position, the rotation of the lens drive motor is reduced, so that the over-correction of the lens 3 is minimized and the stopping accuracy of the lens 3 is significantly improved.

Figure 6:
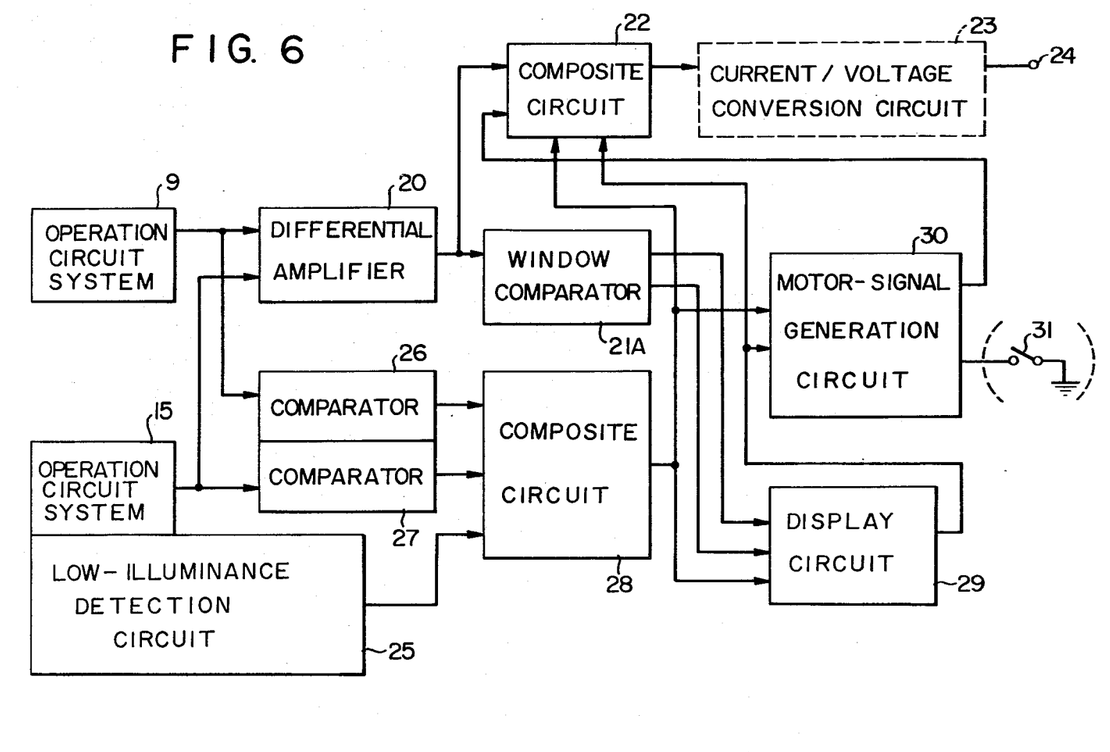
FIG. 6 is a block diagram of another embodiment of a focusing position detection circuit according to the invention.

Referring to FIG. 6, there is shown another embodiment of a focusing position detection circuit according to the invention, which is provided with additional circuits and is improved in function in comparison with the circuit as shown in FIG. 3. In FIG. 6, the same circuit elements as those shown in FIG. 3 bear the same reference numerals.

The additional circuits shown in FIG. 6 will now be explained. In FIG. 6, reference numeral 25 represents a low-illuminance-detection circuit connected to the light receiving element arrays 1 and 2. Reference numerals 26 and 27 represent comparators for judging whether the outputs of the operation circuit systems 9 and 15 are each above or below a predetermined level. Reference numeral 28 represents a composite circuit for synthesizing the output of the low-illuminance-detection circuit 25 and output signals of the comparators 26 and 27. Reference numeral 29 represents a display circuit. Reference numeral 30 is a motor-signal-generation circuit for generating a motor drive signal in a particular state. Reference numeral 31 is a switch for detecting the state of the lens 3. To each of the above-mentioned circuits are applied a necessary reference voltage and a necessary timing signal, but the apparatus for applying those voltages and signals are omitted from FIG. 6.

The low-illuminance-detection circuit 25 can detect that the quantity of light is insufficient and the S/N ratio of the output signals of the light receiving element arrays 1 and 2 cannot be guaranteed. When such detection is done, a low-illuminance signal is output to the composite circuit 28. The outputs of the operation circuit systems 9 and 15 are respectively input to the comparators 26, and 27. The comparative reference voltages of the comparators 26,27 are slightly higher than the reference voltage, assuming that the reference voltage is at a zero level, whereby it is judged whether or not the input signal is extremely close to the zero level, so that the judgment result is output. That the input signals of the comparators 26, 27 are near the zero level signifies that there is almost no contrast in the image on the light receiving element arrays 1, 2. Such a state is brought about when the defocusing is great or when the object itself has no contrast. In any case, neither the operation circuit systems 9, 15 can judge the state of the lens independently, so that output signals of the comparators 26, 27 are both input to the composite circuit 28. The composite circuit 28 generates an output signal and outputs the same to the composite circuit 22 as a selection signal, and to the display circuit 29 as a distance-measurement-impossible signal and to the motor signal generation circuit 30, upon the output signals of the comparators 26, 27 being input or the output signals of the low illuminance detection circuit 25 being input to the composite circuit 28. The window comparator 21A recognizes front focusing, exact focusing or back focusing, by the output signal of the differential amplifier 20, and the recognized result is input to the display circuit 29. The display circuit 29 activates a display element, such as a light emitting diode or a liquid crystal display element, in accordance with the input signal from the window comparator 21, whereby the fact of front-focusing, exact-focusing or back-focusing is displayed. When the distance-measurement-impossible signal is input from the composite circuit 28 to the display circuit 29, the display element provides an alarm, for instance, by flickering the display element. The display circuit 29 outputs an exact-focusing signal in accordance with an exact-focusing-recognized signal from the window comparator 21. The exact focusing signal is input as a second selection signal to a composite circuit 22A and, at the same time, it is input as a stop signal to a motor-signal-generation circuit 30. When the motor-signal-generation circuit 30 receives the distance-measurement-impossible signal from the composite circuit 28, the motor-signal-generation circuit 30 determines the needed driving direction of the lens by a signal indicating the state of the lens obtained by the switch 31, and outputs to the composite circuit 22 such a signal as to apply a predetermined drive to the lens 3 in the above-determined direction. When the selection signal is input from the composite signal 28 to the composite circuit 22A, the input from the differential amplifier 20 is stopped and the output signal of the motor-signal-generation circuit 30 is transmitted to the lens side, whereby the lens 3 is unconditionally moved in one direction and, when an end thereof reaches the extreme end in that direction, the switch 31 is reversed.

By the reversing of the switch 31, the motor-signal-generation circuit 30 outputs to the composite circuit 22A such a signal as to provide the lens 3 with a predetermined drive in the opposite direction. Likewise the composite circuit 22A transmits this signal to the lens side, whereby the lens 3 is moved in the opposite direction and reaches the other extreme end. When the switch 31 is reversed again at that position, the motor-signal-generation circuit 30 receives a signal from the switch 31 and changes its output level to the reference voltage level. The composite circuit 22A transmits this output level to the lens side. Since that output level works as a stop command to the lens drive motor, the lens 3 is stopped.

If, during the movement of the lens 3 which is driven in accordance with the output of the motor-signal-generation circuit 30, either the light receiving element array 1 or the light receiving element array 2 detects an image with sufficient contrast, the output of the comparator 26 or of the comparator 27 corresponding to that light receiving element array is reversed, so that the low-illuminance-detection circuit 25 outputs nothing and the composite circuit does not output the distance-measurement-impossible signal. As a result, the selection signal is no longer input from the composite circuit 28 to the composite signal 22A. In this case, if the exact-focusing signal is no longer input from the display circuit 29 to the composite circuit 22A, the signal from the motor-signal-generation circuit 30 is stopped, and the output signal from the differential amplifier 20 is output to the lens side.

When the lens 3 moves further and reaches the focused range, the output signal of the window comparator 21 indicates that the lens 3 has reached the focusing range, and the display circuit 29 displays that focused state and, at the same time, applies a focused signal to the motor-signal-generation circuit 30. Upon receiving that focused signal, the motor-signal-generation circuit 30 unconditionally holds its output at the reference voltage level. At this moment, since the focused signal has been input from the display circuit 29 to the composite circuit 22A, the composite circuit 22A stops the input from the differential amplifier 20, and the focused signal at the reference voltage level is output from the motor-signal-generation circuit 30, whereby the lens 3 is stopped in the same manner as described above.

Thus, by the insertion of the additional circuit, when the quantity of light is insufficient, when the contrast of an object is extremely low, when the defocusing is extremely great, it is displayed that the distance measurement is impossible and the lens is moved from one extreme end to the other extreme end at least once, in order to find a point at which the distance measurement can be done. If such a point cannot be discovered, the lens is stopped, while, when such a point is found, the focused point is searched for. In this case, since the low-illuminance-detection circuit 25 is not necessarily indispensable, it can be omitted.

In the above-described embodiment, the outputs of the light receiving element arrays are processed in the order of time. Furthermore, a simultaneous processing system can be constructed, in which the same number of differential amplifiers (11 and 17) as the combinations of light receiving elements are employed, and to each of the differential amplifiers is connected a non-linear type processing circuit, whereby the outputs of the light receiving elements in each combination are simultaneously processed. In this system, the operation circuits 14 to 19 are constructed of additional circuits. Further, since the light receiving element arrays can be directly connected to the differential amplifiers (11 and 17) through wires, the selection circuits (10 and 16) are not active circuits.

A further embodiment of the present invention will now be explained, in which charge-coupled devices are employed as the light receiving element arrays. In the case where silicone photodiode arrays are employed, since each light receiving element always generates an output corresponding to the quantity of incident light thereon, any combination of the light receiving elements can be formed when necessary. However, in the case of charge-coupled devices, since each light receiving element generates an output in the predetermined order of the arranged light receiving elements and in the order of time, it is necessary that the output of each light receiving element be temporarily stored by a sample-and-hold circuit when the outputs of the same light receiving elements are employed two or more times or at a desired timing. This is the only difference between the charge-coupled devices and the silicone photodiode arrays, and the remainder of the processing, that is, the processing after the use of the selection circuits (10 and 16), is exactly the same in both cases.

Of the additional circuits, a modification of the motor signal generation circuit 30 will now be explained.

In the embodiment explained above, the state of the lens 3 is determined by the switch 31 which is reversed when the lens 3 has reached one end. In order to perform that operation, at least one cable is necessary for the transmission of signals from the lens side to the camera side. In the case of a single-lens reflex camera, since its lens can be replaced by other lenses, and often is, contact points must be formed in the signal transmission cable. However, the use of such a cable is not conductive to the attainment of high operational reliability and adaptability in a limited space. Therefore, an embodiment of a defocusing position detection circuit of the present invention will now be explained, from which the switch 31 and the signal transmission cable are eliminated.

In this embodiment, a timer circuit is built into the motor-signal-generation circuit 30. The timer circuit is constructed so as to be capable of setting a period of time slightly longer than the period of time required for the lens to move from one extreme end to the other extreme end. Upon the completion of the set period of time, the reversing of the switch 31 is done and, thereafter, the previously described processing is done in the same manner.

For instance, in the case where a distance-measurement-impossible signal is output from the composite circuit 28 when the lens 3 is in the middle portion, the motor-signal-generation circuit 30 outputs a signal by which a first timer circuit is triggered and, at the same time, the lens 3 is in one direction, whereby the lens 3 is moved to one extreme end and is stopped there. However, since the driving signal is continuously applied to the lens drive motor, the lens drive motor is continuously driven. Therefore, it is necessary that slipping of the lens drive motor be allowed during the above-mentioned time when the lens 3 has come to each extreme end. The motor-signal-generation circuit 30 outputs a signal by which a second timer circuit is triggered upon the passage of the set time of the first timer circuit and, at the same, by which signal the lens 3 is moved in the opposite direction and is then stopped at the other end. The lens drive motor makes further rotations, with slipping, and is then stopped by a stop command at the completion of the period of time set by the second timer.

In this embodiment, the above-described waste of time is inevitable, but it has an advantage in terms of construction, since it is unnecessary to provide a contact member between the lens side and the camera side.

Figure 7A:
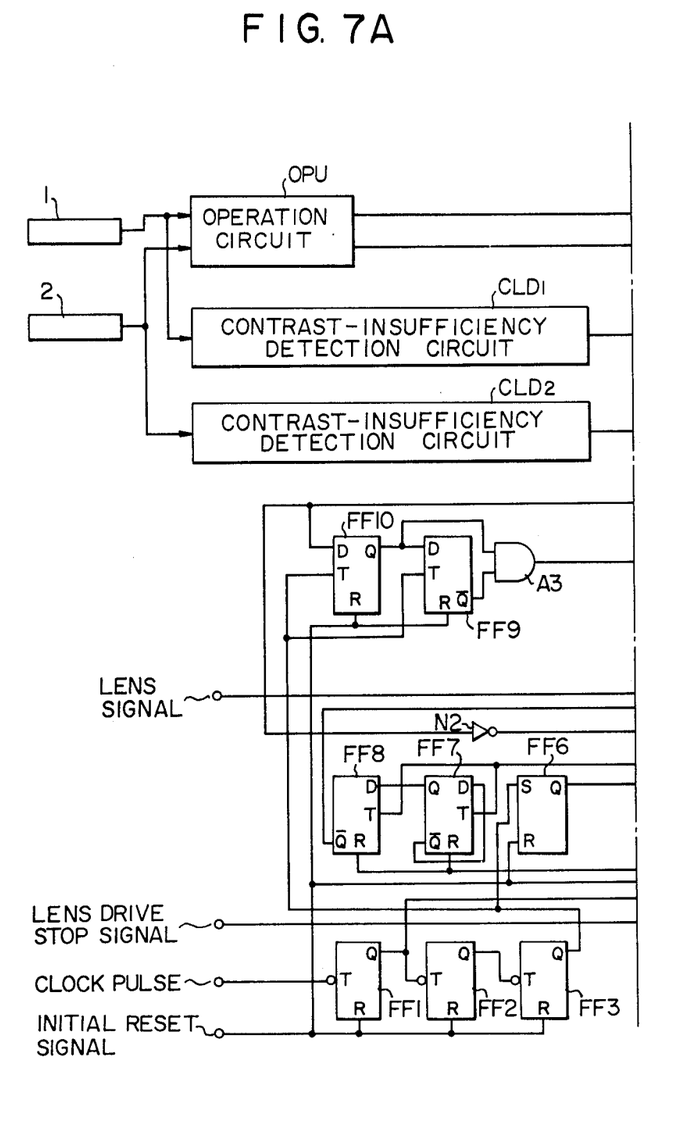
FIGS. 7a and 7b are a block diagram of a further embodiment of the invention.
Figure 7B:
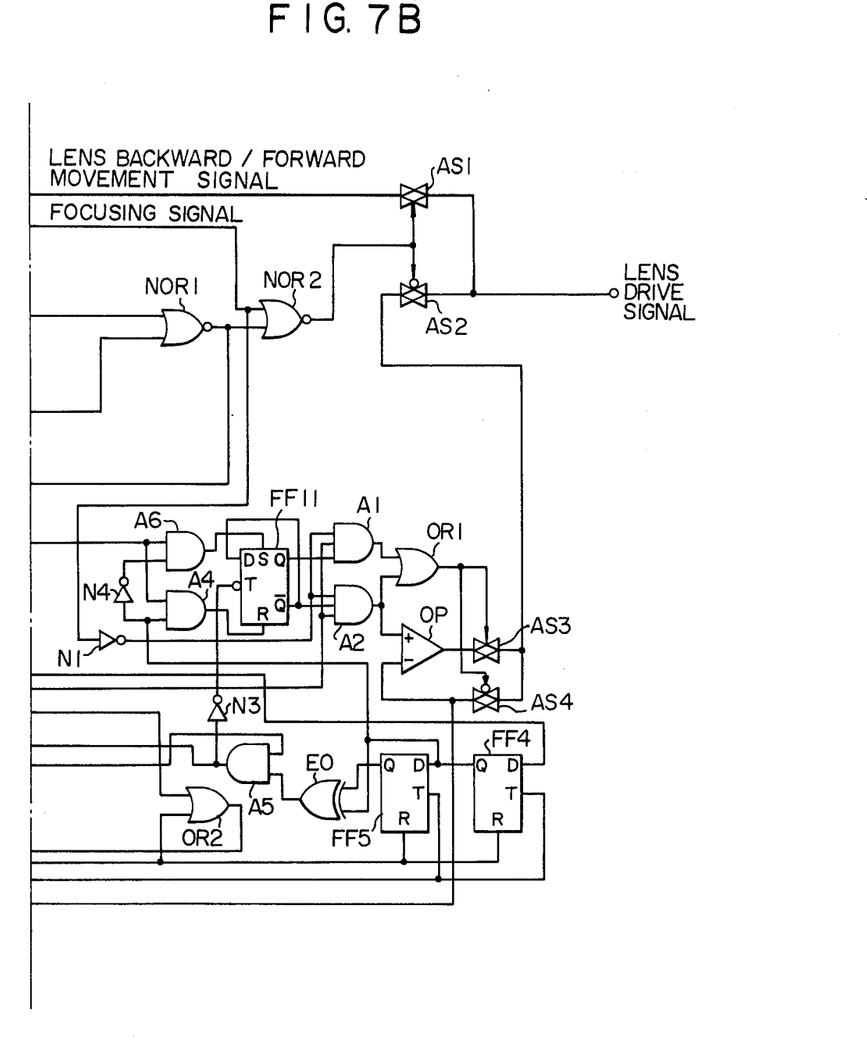

Referring to FIG. 7, there is shown a further embodiment of the present invention. The light receiving element arrays 1 and 2 are respectively disposed in front of and behind a predetermined focusing plane of the lens 3 in the same manner as in the case of the previously explained embodiment. The image of an object is projected upon the predetermined focusing plane through the lens 3. When the defocusing position detection circuit is connected to a power source, flip-flops $FF_1$ to $FF_{10}$ are reset by an initial reset signal. Upon counting clock pulses, the flip-flops $FF_1$ to $FF_3$ generate two type of pulses, and the flip-flop $FF_6$ is set by the output pulse of the flip-flop $FF_3$. An operation circuit OPU processes the output signals of the light receiving element arrays 1 and 2 and, depending upon which is greater, the contrast of the object image in the light receiving element array 1 or the contrast of the object image in the light receiving element array 2 determines the state of the lens 3, that is, whether it is in front focusing, back focusing or exact focusing.

In accordance with that determination, the operation circuit OPU, which comprises the same circuits 9, 12, 15, 20 and 21 as those employed in the previous embodiment, outputs a lens-forward-movement signal or a lens-backward-movement signal. Contrast-insufficiency detection circuits $CLD_1$ and $CLD_2$ are capable of detecting whether or not the contrast of the object image on the light receiving element arrays 1 and 2 is sufficient for determination of the lens position to be performed by the operation circuit OPU. When the contrast of the object image on the light receiving element arrays 1 and 2 is sufficient for the determination of the lens position and the measurement of distance is possible, the outputs of the contrast-insufficiency detection circuits $CLD_1$, $CLD_2$ are both at the H level (i.e., a high level), so that the output of a NOR circuit $NOR_1$ is at the L level (i.e., a low level). When the lens is in an out-of-focus position, the focusing position signal output from the operation circuit OPU is at the L level, so that the output of NOR circuit $NOR_2$ is at the H level. The result is that an analog switch $AS_1$ is turned on, while an analog switch $AS_2$ is turned off. Therefore, the lens-backward-movement or lens-forward-movement signal is transmitted as a lens drive signal to a lens drive portion through the analog switch $AS_1$, whereby the lens is driven to the focusing position. When the lens comes to the focusing position, the level of the focusing signal output from the operation circuit OPU is changed to the H level, and the level of the output from the $NOR_2$ circuit is changed to the L level, so that the analog switch $AS_1$ is turned off, while the analog switch $AS_2$ is turned on. Furthermore, the level of the output of an inverter $N_1$ is changed to the L level and the levels of the outputs of AND circuits $A_1$, $A_2$ are changed to the L level, so that the analog switch $AS_3$ is turned off, while the analog switch $AS_4$ is turned on. As a result, a lens-drive-stop signal at a predetermined level is transmitted to the lens drive portion through the analog switch $AS_4$ and the analog switch $AS_2$, so that the lens is stopped.

A lens signal can be reversed in level to the H level or to the L level when the lens comes to the maximum backward position or to the maximum forward position, and such positioning of the lens is detected by a detecting means. For instance, when the lens signal is at the H level and the contrast of an object image on the light receiving element arrays 1 and 2 is insufficient for the determination of the lens position and the measurement of distance is impossible, the outputs of the contrast-insufficiency-detection circuits $CLD_1$, $CLD_2$ are both changed in level to the L level, and the level of the output of the $NOR_1$ circuit is changed to the H level, while the output of the $NOR_2$ circuit is changed to the L level, so that the analog switch $AS_1$ is turned off, while the analog switch $AS_2$ is turned on. Furthermore, the level of the output of an inverter $N_2$ is changed to the L level, and the level of the output of the OR circuit $OR_2$ is changed to the L level, so that the resetting of the flip-flops $FF_7$, $FF_8$ is cancelled. D flip-flops $FF_4$, $FF_5$ latch the lens signal by the pulse output of the flip-flop $FF_1$, and the rising of the output of NOR circuit $NOR_1$ is detected by a circuit comprising D flip-flops $FF_9$, $FF_{10}$ and the AND circuit $A_3$, whereby the level of the output of the AND circuit $A_4$ is changed to the H level, and a flip-flop $FF_{11}$ is reset and the level of the output of the AND circuit $A_2$ is changed to the H level. As a result, the level of the output of the OR circuit $OR_1$ is changed to the H level and the analog switch $AS_3$ is turned on, while the analog switch $AS_4$ is turned off. To an operation amplifier OP are input the lens-drive-stop signal at a level between the H level and the L level and the output at the H level of the AND circuit $A_2$, so that the level of the output of the operation amplifier OP is changed to the H level. The output at the H level of the operation amplifier OP is transmitted to the lens drive portion through the analog switches $AS_3$, $AS_2$ whereby the lens is moved forwards.

When the lens is moved to its maximum forward-movement position and the level of the lens signal is changed to the L level, the trailing of the lens signal is detected by D flip-flops FF$_4$, FF$_5$ and an EXCLUSIVE "OR" circuit EO, so that a pulse is output from the AND circuit A$_5$. This pulse is counted by a counter comprising D flip-flops FF$_7$, FF$_8$ and, at the same time, the flip-flop FF$_{11}$ is reversed through an inverter N$_3$. Therefore, the level of the output of the AND circuit A$_1$ is changed to the H level, while the level of the output of the AND circuit A$_2$ is changed to the L level, so that the level of the output of the operation amplifier OP is changed to the L level with the analog switch AS$_3$ maintained on, and the output at the L level of the operation amplifier OP is transmitted to the lens drive portion, whereby the backward movement of the lens is initiated.

When the lens comes to the maximum backward position thereafter, and the level of the lens signal is changed to the H level, the rising of the lens signal is detected by D flip-flops FF$_4$, FF$_5$ and the EXCLUSIVE "OR" circuit EO, so that a pulse is output from the AND circuit A$_5$. This pulse is counted by a counter comprising D flip-flops FF$_7$, FF$_8$ and the level of the pulse output from the counter is changed to the level, and the level of each of the outputs of the AND circuits A$_1$, A$_2$ is changed to the level L level, so that the analog switch AS$_3$ is turned off, while the analog switch AS$_4$ is turned on, whereby the lens-drive-stop signal is transmitted to the lens drive portion through the analog switches AS$_4$, AS$_2$ and the lens is stopped.

When the measurement of distance becomes impossible with the level of the lens signal at the L level, the lens is moved backwards and is then moved forwards and finally stopped. This operation is possible in direction to the operation explained above. In this case, the lens signal which is initially at the level L is latched by the flip-flop FF$_4$ and the output of the inverter N$_4$ is at the H level. Therefore, the rising of the output of the NOR circuit NOR$_1$ is detected by the flip-flops FF$_9$, FF$_{10}$ and the AND circuit A$_3$, and the level of the AND circuit A$_6$ is changed to the H level, so that the flip-flop FF$_{11}$ is set. As a result, the level of the output of the operation amplifier OP is changed to the level L, and the output at the L level of the operation amplifier OP is transmitted to the lens drive portion, whereby the lens is moved backwards. When the lens thereafter comes to the maximum backward position and the level of the lens signal is changed to the H level the flip-flop FF$_{11}$ is reversed by the rising of the lens signal and the level of the output of the operation amplifier OP is changed to the H level, so that the lens is moved forwards.

When the lens comes to the maximum forward position and the level of the lens signal is changed to the L level, the level of the outputs of the counters FF$_7$, FF$_8$ is changed to the L level and the level of the outputs of the AND circuits A$_1$, A$_2$ is also changed to the L level, so that the lens-drive-stop signal is transmitted to the lens-drive-portion and the lens is stopped.

Thus, when the measurement of distance becomes impossible, the lens is driven through the entire lens drive range only one time and is then stopped. However, if the measurement of distance becomes possible during the above-mentioned driving of the lens, at least one of the outputs of the contrast-insufficiency-detection circuits CLD$_1$, CLD$_2$ is changed in level to H and thereafter the focusing operation is performed in the same manner as described above.

In the above embodiment, the lens is driven by use of the lens signal. The driving of the lens can also be performed in the same manner by use of a clock pulse having a period sufficiently longer than the period of time required for moving the lens from the maximum backward position to the maximum forward position or vice versa. The present invention is not limited to the above described embodiment, but can be applied to a variety of automatic focusing position detection circuits for preventing erroneous distance measurement caused by the insufficiency of contrast of object images.

What is claimed as new and desired to be secured by Letters Patent of the United States is:

1. A focusing position detection circuit comprising:
   two sets of light receiving arrays respectively disposed in front of and behind a predetermined focusing plane of an optical system;
   first means and second means for selecting predetermined combinations of two light receiving elements from each of said light receiving arrays, said combinations including combinations of adjacent and non-adjacent light receiving elements, for obtaining the differences in output between said light receiving elements in said combinations, and for subjecting said differences in output to non-linear type processing;
   third means for obtaining the difference in output between said first means and said second means; and
   fourth means for outputting an analog signal corresponding to the position of said optical system in the defocused range and outputting a focused signal at a predetermined level in the focused range with a predetermined tolerance range, by judging the position of said optical system based on the signal output from said third means.

2. A focusing position detection circuit as claimed in claim 1, wherein said fourth means comprises:
   fifth means for detecting that said optical system is positioned in said focused range having a predetermined tolerance range by the output signal of said third means; and
   sixth means for outputting said output signal of said third means when it is detected from the output signal of said fifth means that said optical system is not in said focused range, but, when said optical system is in said focused range, outputting the focused signal.

3. A focusing position detection circuit as in claim 2, further comprising:
   seventh means for detecting the fact of distance measurement being impossible; and
   eighth means for generating a signal, based on the output of said seventh means, by which signal said optical system is mechanically moved.

* * * * *